United States Patent [19]

Bird

[11] 4,080,103
[45] Mar. 21, 1978

[54] PORTABLE AIR COMPRESSOR SYSTEM FOR RESPIRATOR

[76] Inventor: Forrest M. Bird, 212 NW. Cerritos, Palm Springs, Calif. 92262

[21] Appl. No.: 758,662

[22] Filed: Jan. 12, 1977

[51] Int. Cl.² ............... F04B 49/00; A62B 7/00; B01D 45/00; B01D 53/26
[52] U.S. Cl. ................... 417/3; 128/145.6; 55/213; 55/267
[58] Field of Search ............... 417/2-7; 128/145.6; 55/213, 267; 62/93

[56] References Cited

U.S. PATENT DOCUMENTS

| | | | |
|---|---|---|---|
| 2,537,094 | 1/1951 | Schmidlin | 55/213 |
| 2,669,321 | 2/1954 | Schmidlin | 55/267 |
| 3,140,590 | 7/1964 | Gleockler | 55/267 |
| 3,216,648 | 11/1965 | Ford | 62/93 |
| 3,420,069 | 1/1969 | Booth | 55/267 |
| 3,435,822 | 4/1969 | Ziermann et al. | 128/145.6 |
| 3,851,695 | 12/1974 | Connel | 128/145.6 |
| 3,889,484 | 6/1975 | Horst et al. | 62/93 |

*Primary Examiner*—William L. Freeh

*Attorney, Agent, or Firm*—Flehr, Hohbach, Test, Albritton & Herbert

[57] ABSTRACT

Portable air compressor system for a respirator and adapted to be operated from a source of power. A plurality of compressors are provided. Each compressor has a fan for causing air to move over the compressor and has an outlet supplying compressed air. A cooling coil is provided having an inlet and an outlet and is positioned so that the fans of the compressors force air over the cooling coil. Piping connects the outlets of the compressors to the inlet of the cooling coil. A water trap is provided. Piping connects the outlet of the cooling coil to the water trap. An air reservoir is provided which has an inlet that connects it to the water trap and an outlet which is adapted to be connected to the respirator. A pressure regulator is provided which is in communication with the reservoir. A pressure switch is provided which is connected to the regulator and at least one of the compressors for halting operation of said at least one compressor when a predetermined pressure is reached in the reservoir.

6 Claims, 3 Drawing Figures

U.S. Patent        March 21, 1978        4,080,103
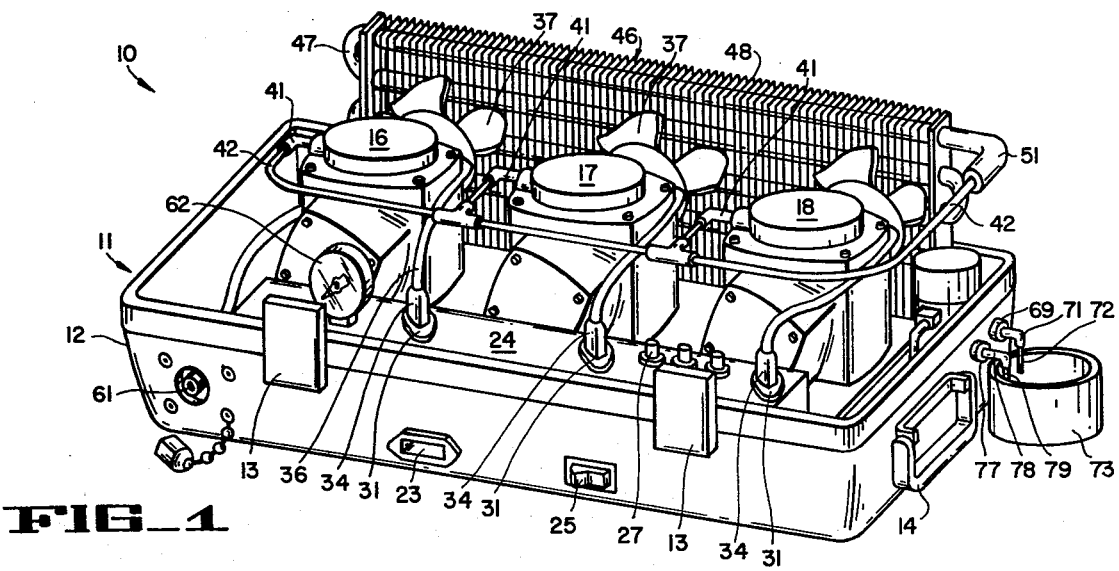
FIG_1
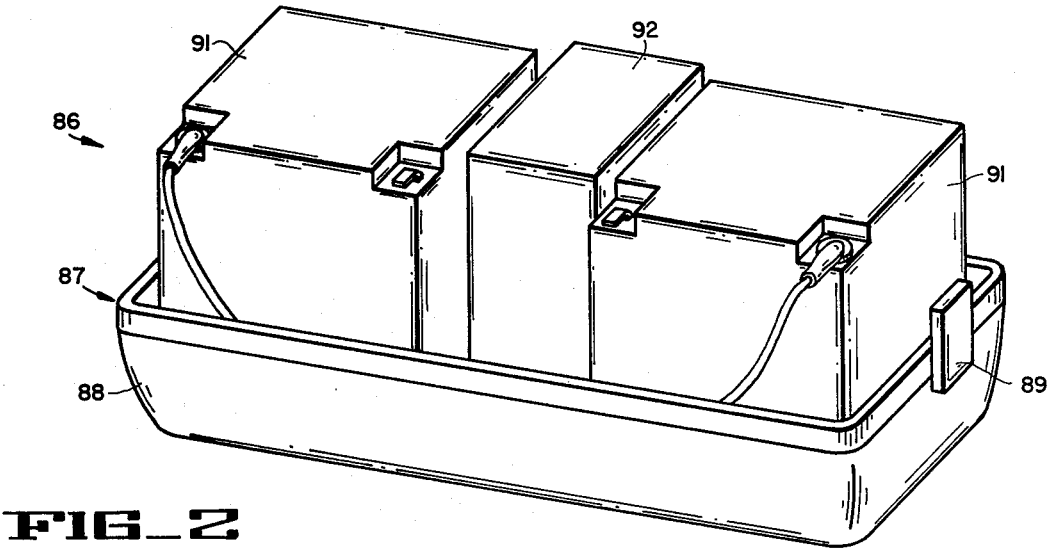
FIG_2
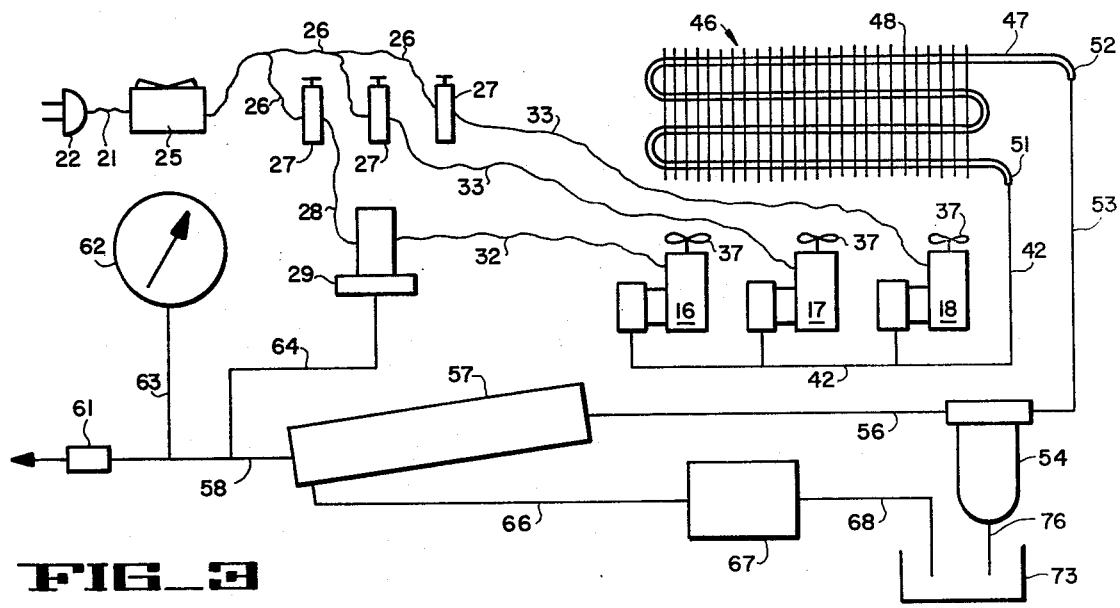
FIG_3

4,080,103

PORTABLE AIR COMPRESSOR SYSTEM FOR RESPIRATOR

BACKGROUND OF THE INVENTION

In the operation of respirators, it is desirable to provide dry air having a suitable pressure as for example 50 psi. It has been difficult to provide dry air at such a pressure in many locations and in particular vehicles and remote locations. There is therefore a need for a compressor system for providing dry air at desired pressures.

SUMMARY OF THE INVENTION AND OBJECTS

The portable air compressor system for use with a respirator is adapted to be operated from a source of power. It consists of a plurality of compressors each of which has a fan for causing air to move over the compressor and each of which has an inlet for receiving atmospheric air and an outlet for supplying compressed air. A cooling coil having an inlet and an outlet is positioned so that the fans of the compressors force air over the cooling coil. Piping means connects to the outlets of the compressors to the inlet of the cooling coil. A water trap is provided. Means is provided for connecting the outlet of the cooling coil to the water trap. A reservoir is provided which has an inlet connected to the water trap and an outlet adapted to be connected to the respirator. A pressure regulator is in communication with the reservoir. A pressure switch is connected to the regulator and to at least one of the compressor for halting operation of said at least one compressor when a predetermined pressure is reached in the reservoir.

In general, it is an object of the invention to provide a portable air compressor system which can be utilized to provide dry air to a respirator.

Another object of the invention is to provide a system of the above character in which a number of compressors are provided so that on light air requirement applications, only a certain number of the compressors need be operating.

Another object of the invention is to provide a system of the above character in which undesired water is removed from the air.

Another object of the invention is to provide a system of the above character which can be operated from a portable power pack.

Another object of the invention is to provide a system of the above character in which the power pack is portable and can be readily recharged.

Additional objects and features of the invention will appear from the following description in which the preferred embodiment is set forth in detail in conjunction with the accompanying drawings.

BRIEF DESCRIPTION OF THE DRAWINGS

FIG. 1 is a perspective view of a portable air compressor system incorporating the present invention with the top part of the carrying case removed.

FIG. 2 is a perspective view of a portable power pack which can be utilized for powering the compressor system shown in FIG. 1 with the top part of the carrying case removed.

FIG. 3 is a schematic diagram of the compressor system shown in FIG. 1.

DESCRIPTION OF THE PREFERRED EMBODIMENT

The portable air compressors system 10 shown in FIG. 1 consists of a two-part carrying case 11 of a conventional type in which is provided with top and bottom parts of which the bottom part 12 is shown. The bottom part 12 is provided with latches 13 for securing the top part (not shown). The bottom part 12 is also provided with a carrying handle 14 at one end.

Three compressors 16, 17, and 18 of a conventional type are provided. The compressors are capable of taking in atmospheric air and producing air at an elevated pressure as for example a pressure ranging from 50 to 80 psi. The compressors 16, 17, and 18 are secured to the bottom wall of the bottom part 12 of the carrying case 11.

Each of the compressors includes an electric motor for driving the same. Means is provided for supplying electrical power to the motors and consists of a power cord 21 which is provided with a male plug (not shown) that is adapted to be inserted into a female receptacle 23 mounted in the carrying case 11. The receptacle 23 is connected to a power supply manifold 24 mounted within the carrying case 11 and to an on/off switch 25 also mounted in the carrying case 11. The on/off switch 25 is connected by conductors 26 to circuit breakers 27 mounted in the top of the manifold 24. One of the circuit breakers 27 is connected by a cord 28 to a pressure switch 29 and the pressure switch 29 is connected to a receptacle 31 mounted in the top of the manifold 24 by a cord 32. The other two circuit breakers 27 are connected by cords 33 to additional receptacles 31 provided in the top of the manifold 24. Plugs 34 are adapted to be inserted into the receptacles 31 and are connected by cords 36 to the respective compressors 16, 17, and 18. Each of the compressors 16, 17, and 18 is provided with a fan 37 for causing air to move over the compressor and to cool the same.

Each of the compressors is provided with an inlet (not shown) for receiving atmospheric air and an outlet 41 for supplying air at a desired pressure as for example a pressure range from 50 to 80 psi. The outlets are 41 interconnected by piping 42. A cooling coil assembly 46 is provided within the carrying case 11 and consists of a cooling coil 47 formed of a suitable material such as copper. A plurality of cooling fins 48 also form a part of the cooling coil system and are in a conductive relationship with the cooling coil and are mounted in directions at right angles to the plane of the cooling coil, the cooling fins 48 are spaced apart so that air movement caused by the fans 37 will move between the cooling fins. The cooling coil 47 is provided with an inlet 51 and outlet 52. As can be seen from FIG. 1, the outlet of the piping 42 is connected into the inlet 51. As also can be seen from FIG. 1, the piping 42 has a diameter which is substantially less than the diameter of the inlet 51 for purposes hereinafter described. The outlet 52 of the cooling coil is connected by piping 53 to the inlet of a water trap 54. The outlet from the water trap 54 is connected by piping 56 to the inlet of a reservoir 57. The reservoir 57 is mounted within the carrying case 11 and is inclined in a downward direction towards the outlet. The outlet end of the reservoir is connected by piping 58 to an outlet fitting 61 provided on the carrying case. A pressure gauge 62 is connected by a piping 63 into the piping 58 and measures the pressure of gas being supplied to the outlet fitting 61. The pressure switch 29 is connected by piping 64 into the outlet piping 58. The lower end of the reservoir 57 is connected by piping 66 to a pressure regulator 67. The outlet of the pressure regulator 67 is connected by piping 68 through a fitting 69 mounted in the carrying case 11. A 90° elbow 71 is mounted in the fitting 69 and carries a tube 72 which extends downwardly into a cup-like receptacle 73 positioned outside of the carrying case 11. The lower extremity of the water trap is connected by piping 76 into a fitting 77 also provided on the carrying case. A 90° elbow 78 is mounted in the fitting and carries a tube 79 which is also adapted to extend into the cup-like receptacle 73. Thus, it can be seen that the cup-like receptacle 73 collects water from both the tube 79 and the tube 72.

It is intended that the air compressor system shown in FIG. 1 can normally be operated from a conventional source of supply as for example 115 volts ac. However, in a number of applications, it may be desirable to have the air compressor system operate on a different voltage as for example the 28 volts dc found in aircraft. When such a voltage is required, the air compressor system can be readily operated from a power pack 86 of the type as shown in FIG. 2. As shown therein, the power pack 86 consists of a carrying case 87 also of a conventional type which is provided with an upper part (not shown) and a lower part 88. The lower part 88 is provided with latches 89 so that it can be secured to the top part not shown. The lower part 88 is of a sufficient size so that it can carry two large 12 volt rechargable batteries 91 of a conventional type so that when they are combined in series, they can provide a total of 24 volts which is suitable for operating the air compressors. In addition, the power pack 86 includes a battery charger 92 of a conventional type which can be utilized for recharging the batteries from a suitable source of power as for example 115 volts ac.

Operation and use of the portable air compressor system shown in FIG. 1 may now be readily described as follows. Let it be assumed that the air compressor system is of a type which operates on 28 volts dc and that it is desired to utilize the same in a remote location. When this is the case, the batteries 91 in the power pack 86 are connected in series and are connected into the power receptacle 23. The on/off switch 25 can then be operated. Assuming that all the circuit breakers 27 are in the on position, all three of the compressors 16, 17, and 18 will start operating. These compressors will take inlet air and compress the inlet air and supply compressed air into the piping 42 and then into the large cooling tube 51. At the time the compressed air enters the large cooling tube, there is a sudden expansion of the air which will have a tendency to cause any moisture carried within the atmospheric air to be precipitated out. The precipitation out of any moisture carried by the air is further facilitated by the cooling coil 47 which is cooled by the cooling fins 48. The cooling fins 48 are cooled by air being drawn through the same by operation of the fans 37. Further cooling of the cooling coil causes the moisture to precipitate out and drain into the water trap 54 and thence into the receptacle 73. The air which is compressed is stored in the reservoir 57 so that there will be an adequate supply of air available to the respirator. The reservoir 57 is formed of a suitable material such as plastic pipe and is provided with a copper mesh within the same to inhibit the growth of bacteria. Any additional water which precipitates out of the air in the resevoir 57 will be drained through the line 66 through the pressure regulator 67, the piping 68 into the receptacle 73. The reservoir has been inclined as shown so that any water precipitating out of the air will drain to the lowermost end and be collected by the piping 66 and supplied to the receptacle 73.

The dry air which is contained in the reservoir is supplied to the receptacle 61 where it can be supplied to a respirator. The pressure regulator 67 is set at a predetermined pressure so that it will bleed off air when the pressure exceeds a predetermined amount as for example 60 psi. The pressure switch 29 also is set at a pressure which is less than that of the pressure regulator 67 and which is above that of the desired pressure of 50 psi as for example 55 psi. When the pressure switch 29 is operated, this cuts out or shuts off at least one of the compressors as for example the compressor 16. It can be readily appreciated that if desired, an additional pressure can be switched out at the same time by connecting the same to the pressure switch 29. This insures that a minimum of power will be utilized for the compressor system. This is particularly important when a battery pack is being utilized as a power supply. It has been found that normally two of the compressors can supply the needs of a conventional respirator and that the third compressor is only required during peak periods. Thus, it can be seen by providing a plurality of compressors and by shutting at least one of the compressors off at certain periods of time, it is possible to minimize the power requirements for operating the compressor system. This is particularly important at remote locations where a battery pack is required.

It is apparent from the foregoing that there has been provided a portable air compressor system which can be readily transported from one location to another. It is relatively compact even through a plurality of compressors are provided and can be readily packaged in a single carrying case. In addition, the power pack which is required for power also can be carried in a single carrying case. The compressor system provides dry air at the desired pressure of approximately 50 psi and is easy to operate and maintain.

I claim:

1. In an air compressor system for use with a respirator adapted to be operated from a source of power, a plurality of compressors, each of said compressors having a fan for causing air to move over the compressors and having an inlet for receiving atmospheric air and outlet for supplying a compressed air, a cooling coil having an inlet and a outlet positioned so that the fans of said compressors force air over the cooling coil, means connecting the outlets of the compressors to the inlet of the cooling coil, a water trap, means connecting the outlet of the cooling coil to the water trap, a reservoir having inlet connected to the water trap a pressure regulator in communication with the reservoir and a pressure switch connected to the reservoir and to at least one of the compressors for halting operation of said at least one compressor when a predetermined pressure is reached in the reservoir.

2. A system as in claim 1 together with a carrying case and means mounting said compressors, said cooling coil, said water trap and said reservoir in said carrying case.

3. A system as in claim 1 together with means for collecting water which precipitates out in the reservoir.

4. A compressor system as in claim 3 wherein said reservoir is inclined at an angle so that water precipitating out of the air will collect at one end of the reservoir.

5. A system as in claim 1 wherein three of said compressors are provided and wherein they are mounted side by side in a row and wherein said cooling coil is mounted in a plane which is disposed at a generally right angles to the direction of air flow caused by the fans.

6. A system as in claim 5 together with cooling fins carried by the cooling coil.

* * * * *